US008538569B1

(12) United States Patent
Plummer

(10) Patent No.: US 8,538,569 B1
(45) Date of Patent: Sep. 17, 2013

(54) METHOD FOR FORMING FAUX DISTRESS MARKS IN FIBERGLASS DOORS

(75) Inventor: John B. Plummer, Houston, TX (US)

(73) Assignee: Glasscraft Door Company, Houston, TX (US)

(*) Notice: Subject to any disclaimer, the term of this patent is extended or adjusted under 35 U.S.C. 154(b) by 278 days.

(21) Appl. No.: 13/097,606

(22) Filed: Apr. 29, 2011

(51) Int. Cl.
*G06F 19/00* (2011.01)

(52) U.S. Cl.
USPC .......... 700/97; 427/554

(58) Field of Classification Search
None
See application file for complete search history.

(56) References Cited

U.S. PATENT DOCUMENTS

| | | | | |
|---|---|---|---|---|
| 5,568,391 | A * | 10/1996 | Mckee | 700/122 |
| 6,979,475 | B2 * | 12/2005 | Dresser | 427/258 |
| 8,304,022 | B1 * | 11/2012 | Kitchens | 427/267 |
| 2005/0239931 | A1 * | 10/2005 | Bolton et al. | 524/198 |
| 2005/0251275 | A1 * | 11/2005 | Carlson | 700/98 |
| 2008/0241396 | A1 * | 10/2008 | Dresser | 427/262 |
| 2009/0266804 | A1 * | 10/2009 | Costin et al. | 219/121.85 |
| 2010/0119858 | A1 * | 5/2010 | Benkhoff et al. | 428/537.1 |
| 2010/0183822 | A1 * | 7/2010 | Ruggie et al. | 427/555 |
| 2010/0272961 | A1 * | 10/2010 | Costin, Jr. | 428/156 |
| 2011/0049766 | A1 * | 3/2011 | Del Mundo et al. | 264/400 |

OTHER PUBLICATIONS

Sintec Optronics Laser Marking Technologies Aug. 29, 2005 Sintec Optrronics Pte Ltd sintecoptronics com.*
Masonite How to Stain Fiberglass Entry Systems 2007 accessed Masonite com.*
Old Masters Fast Dry Wood Stain Product Data Sheet Aug. 5, 2008 accessed at thepaintstore com.*

* cited by examiner

*Primary Examiner* — Ryan Jarrett
*Assistant Examiner* — Michael Scapin
(74) *Attorney, Agent, or Firm* — Buskop Law Group, PC; Wendy Buskop

(57) ABSTRACT

One or methods for improving a component are provided. The method can include using a processor with data storage and computer instructions in the data storage to allow a user to select from: drawing a custom mark in full size and producing a graphic file of a custom mark, selecting a pattern from a library of patterns for the component in a graphic file, or changing a photograph of an existing mark and changing the photograph into a graphic file.

15 Claims, 3 Drawing Sheets

METHOD FOR FORMING FAUX DISTRESS MARKS IN FIBERGLASS DOORS

FIELD

The present embodiments relate to a method for improving a component.

BACKGROUND

A need exists for a simple method to improve or treat components, such as fiberglass doors to provide a component with variable shaped distress marks and other feature simulating old growth wood.

A need exists for a method of forming antique looking distress marks in components.

The present embodiments meet these needs.

BRIEF DESCRIPTION OF THE FIGURES

The detailed description will be better understood in conjunction with the accompanying drawings as follows.

Figure 1:
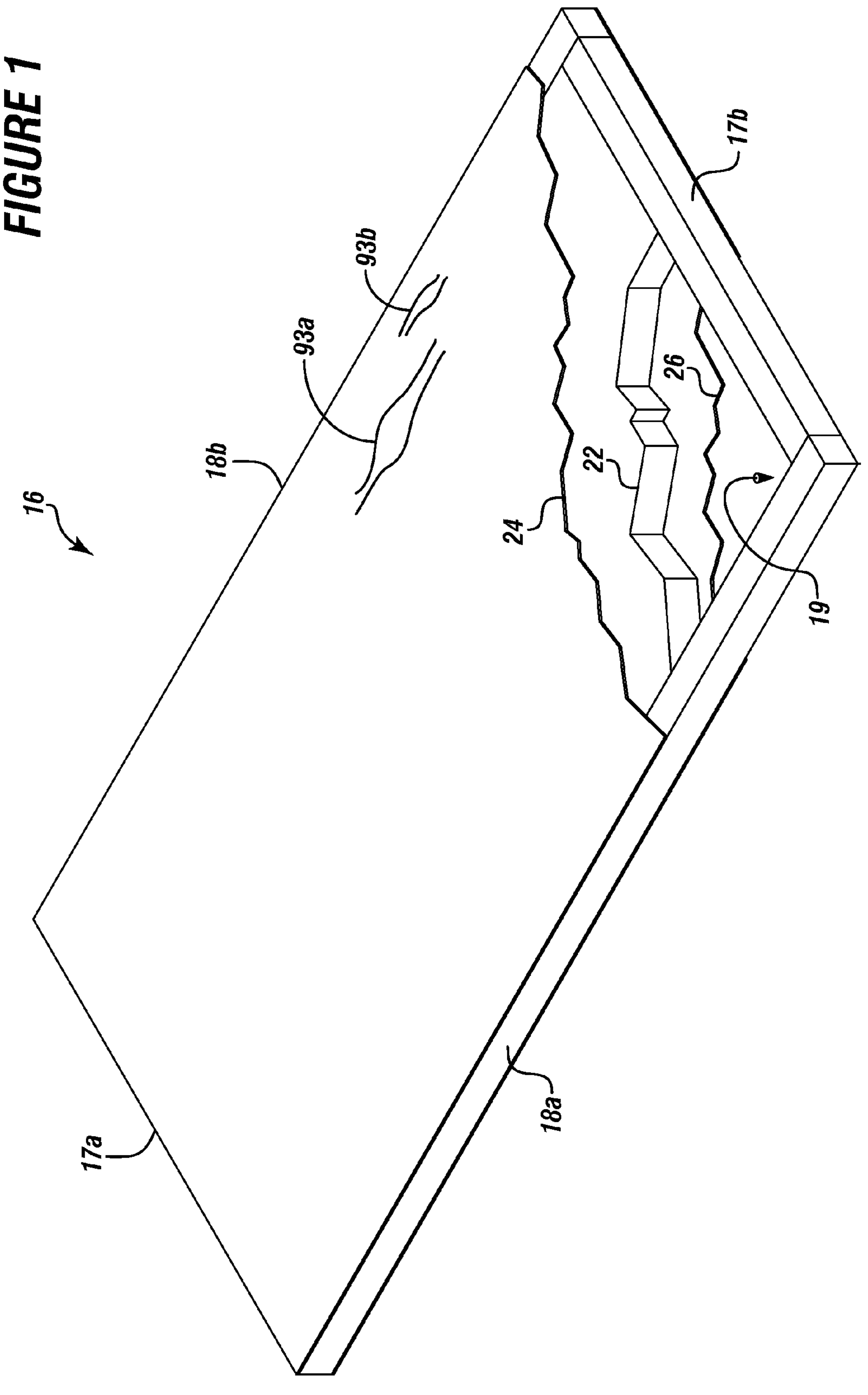
FIG. 1 is a cross sectional view of a component.

The present embodiments are detailed below with reference to the listed Figures.

DETAILED DESCRIPTION OF THE EMBODIMENTS

Before explaining the present apparatus in detail, it is to be understood that the method is not limited to the particular embodiments and that it can be practiced or carried out in various ways.

One or more embodiments generally relate to a method for improving a component. The component can be made from fiberglass, polymers, wood, copolymers, composite material, or other synthetic or natural materials. The composite material can be wood plastic composite. The component can be a door, a window frame, a plank, a sidelight, a door frame, a window, a post, or combinations thereof.

In one or more embodiments the method can include using a processor with data storage and computer instructions in the data storage to allow a user to select from: drawing a custom mark in full size and producing a graphic file of a custom mark, selecting a pattern from a library of patterns for the component in a graphic file; or changing a photograph of an existing mark and changing the photograph into a graphic file. The computer instructions can be commercially available software or computer code. The graphic files can be vector based, bit-mapped, other graphic files, or combinations thereof.

The custom mark can be one or more distressed wood marks, one or more letters, one or more numbers, one or more images, one or more logos, one or more slogans, or combinations thereof. For example, the custom mark can be room number. In another example, the custom mark can be a distress mark. Illustrative images depicting, symbols, such as the lone star, animals, people, ornamental designs, landscapes, and the like can be used.

In one or more embodiments the user can additionally select from a library of custom images that include one or more designs of a custom mark. The library of custom images can be provided from a manufacture or a third party. The library of custom images can be resident on the processor or accessible via a network. F or example, the library of custom images can be on a remote server and accessed via the internet.

The method can also include converting the graphic file into computer code for operating a high speed laser. The conversion of the graphic file can be performed using commercially available software.

The method can also include positioning the component to allow a high speed laser beam to impact the component. For example, the component can be placed on a table that is aligned with the laser within the focal point of the laser.

The high speed laser can have a power output of at least 200 watts of power. The high speed laser can be a carbon dioxide laser. Other lasers that can be used can include (1) stroke Nd:YAG, (neodymium doped yttrium aluminum garnet) CW (continuous wave) diode-pumped (2) Nd:YAG, CW lamp-pumped, (3) frequency-doubled ND:YAG, (4) helium-neon, (5) stroke CO.sub.2, sealed RF excited, (6) mask CO.sub.2, pulsed TEA and (7) mask Excimer, pulsed.

The method can also include setting a desired intensity range for the laser. The desired intensity can be from about 20 percent to about 95 percent of the total power output of the high speed laser. The high speed laser beam can be moved at a speed of from about 100 mm/second to about 20,000 mm/second.

The method can also include evaporating portions of the component using the laser. For example, if the component has a skin made of a thin layer of polymer, the laser can evaporate a portion of the thin layer to form the custom mark. The processor can use the computer code formed by the graphic image vector file to control the laser to form a custom mark having the shape of the image depicted in the graphic image vector file.

In one or more embodiments, the laser can evaporate a portion of the component to a depth of no more than 98 percent of the thickness of a front skin forming the shape of the custom mark. In one or more embodiments, the laser evaporates a portion of the component to a depth of from 1 micron to about 2,000 microns.

In one or more embodiments, one or more custom marks can be formed on the component. For example, the custom marks can be placed in a pattern on the component. For example, the pattern can be a series of distress wood marks arranged to give the component an aged look.

In one or more embodiments, selected patterns can be placed on components that can be arranged to form a message or provide information.

One or more embodiments of the invention can include forming a pattern on the component that includes one or more first custom marks and one or more differing custom marks. For example, the method can include forming a plurality of first custom marks on the component and forming a plurality of second custom marks on the component.

The method can also include cleaning and removing residue from the component after one or more custom marks are formed thereon to prepare the component to receive a first water based urethane glaze compound.

The first water based urethane glaze compound can be applied to the component after residue is removed from the component. After application of the first water based urethane glaze, the method can include drying the first water based urethane glaze compound. The first water based urethane compound can be dried for 2 minutes to 5 minutes. The thickness of the first water based urethane glaze compound can be from 1 wet mil to 3 wet mil.

The method can also include applying a second water based urethane glaze compound to the component. The second water based urethane glaze can be in a chromatically contrasting color to the first water based urethane glaze compound.

The method can include removing at least a portion of the second water based urethane glaze compound from the component. The second water based urethane glaze compounds can have a thickness from 1 wet mil to 3 wet mil.

The method can also include drying the second water based urethane glaze compound, e.g., the second water based urethane glaze compound can be dried for 2 minutes to 5 minutes.

The method can also include applying a third water based urethane glaze compound to the component. The third water based urethane glaze compound can be in a chromatically contrasting color to the first water based urethane glaze compound and the second urethane glaze compound.

The method can also include removing all portions of the third water based urethane glaze compound, which did not fall within the custom mark formed by the laser, from the component, and drying the third water based urethane glaze compound.

The water based urethane glaze compounds can be anti-static. The water based urethane glaze compounds can have a 7.5 pH to 8 pH. For example, a water based urethane glaze coating can be provided by Gemini Coatings Company. The water based urethane glaze compounds, the clear coat, or combinations thereof can have a resin and acrylic component. The water based urethane glaze compounds, the clear coat, or combinations thereof can have a pigment load of from about 30 weight percent to about 70 weight percent.

In one or more embodiments, the method can include applying a clear coat to the entire surface that has been treated with the water based urethane glaze compounds. The method can also include allowing a thicker portion of the clear coat to collect in the custom mark.

The following examples are presented to further illustrate the invention, but it is not to be considered as being limited thereto.

EXAMPLE 1

In operation, a 36 inch×80 inch door of foam filled fiberglass can be improved to include one or more custom marks, using a carbon dioxide laser. The high speed laser beam speed can be 10,000 mm/sec. An image can be made or chosen from one or more libraries discussed herein, for example, a custom mark such as a distress mark can be chosen from an online database, and provided to a processor in communication with the carbon dioxide laser. In addition, a pattern can be provided to the carbon dioxide laser so that the carbon dioxide laser will create a plurality of the chosen custom marks on a component.

The component, such as a synthetic board, a fiberglass door, wood, or the like can be placed adjacent to or aligned with the carbon dioxide laser. The carbon dioxide laser can then use the provided graphic image and desired pattern, for example, using commercially available plotting software, such as used for CNC machines, can form the customs marks on the door by moving a mirror to direct the high speed laser beam to specific points on the component.

The carbon dioxide laser can be configured to align the high speed laser beam with different portions of the component. The high speed laser beam can evaporate portions of the component. The evaporation depth can vary depending upon the chosen power level, laser beam speed, and density of the door material.

Turning now to the Figures, FIG. 1 depicts a partial cut away section of a door 16 according to one or more embodiments.

The door 16 can have a first horizontal edge 17*a*, a second horizontal edge 17*b*, a first vertical edge 18*a*, and a second vertical edge 18*b*. The vertical edges 18*a* and 18*b* can be parallel to one another, and the horizontal edges 17*a* and 17*b* can be parallel to one another. The horizontal edges 17*a* and 17*b* can be connected to the vertical edges 18*a* and 18*b*. A space 19 can be formed between the connected edges 17*a*, 17*b*, 18*a*, and 18*b*.

A closed cell foam 22 can be located in the space 19. The closed cell foam 22 can have a high R value. Accordingly, the closed cell foam can provide thermal and sound insulation.

A front skin 24 can be disposed on a front side of the edges and the closed cell foam 22. The front skin 24 can be a fiber reinforced polymer substrate substantially between 2 mm and 3.5 mm.

The back skin 26 can be disposed on the edges and the closed cell foam 22 opposite the front skin. The back skin can be fiber reinforced polymer substrate. The back skin can have a thickness of from 2 mm to 3.5 mm.

One or more custom marks 93*a* and 93*b* can be formed into the front skin, back skin, or combinations thereof.

Figure 2:
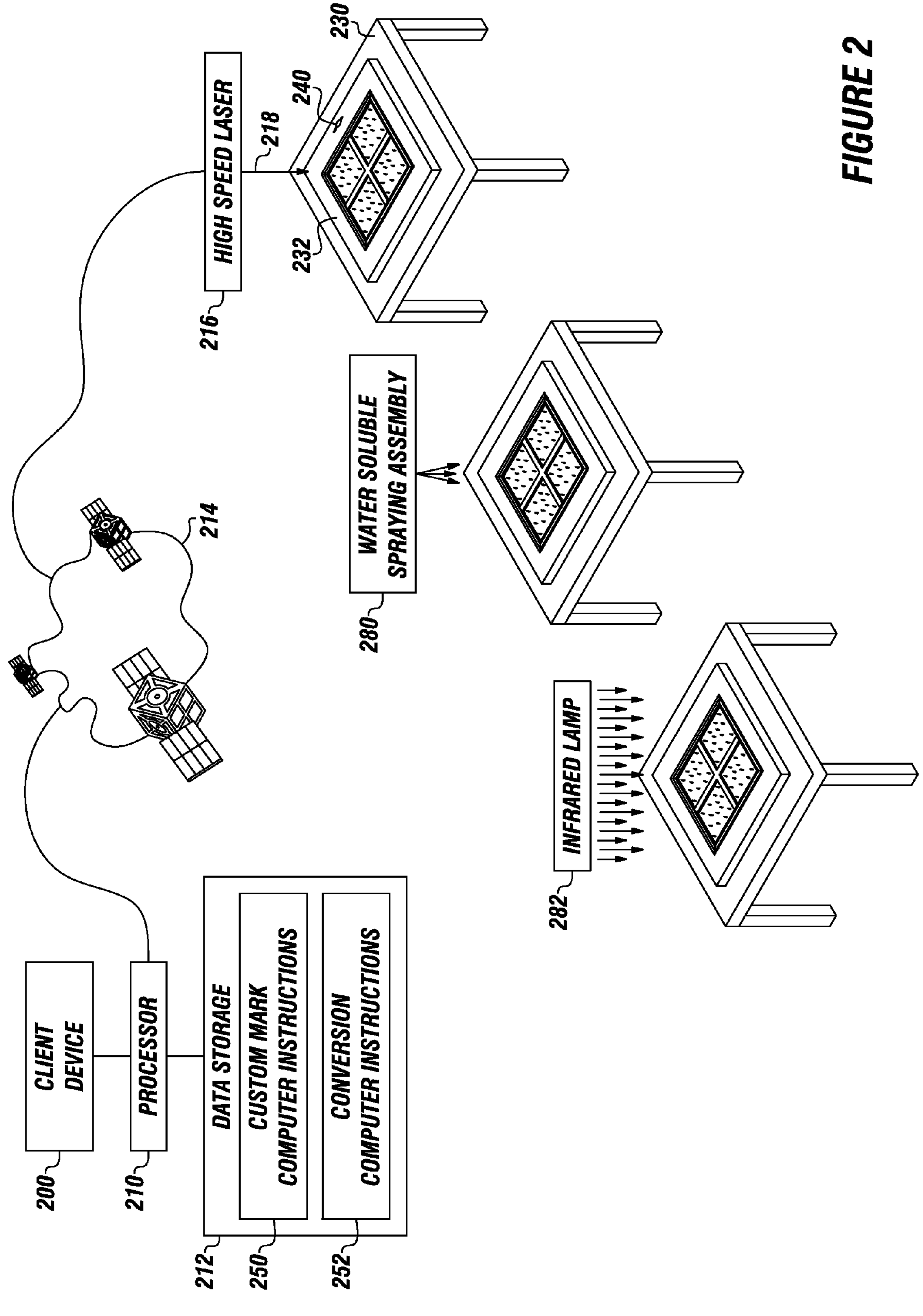
FIG. 2 is a diagram of a system that can be used to improve a component.

FIG. 2 is a diagram of a system that can be used to improve a component.

The system can include a client device 200 in communication with a client device processor 210, and client device data storage 212.

The client device data storage 212 can include custom mark computer instructions 250 in the data storage. The custom mark computer instructions 250 can to allow a user to select from: drawing a custom mark in full size and producing a graphic file of a custom mark, selecting a pattern from a library of patterns for the component in a graphic file, changing a photograph of an existing mark and changing the photograph into a graphic file, or using a library of custom images that a user can select from to impart the custom mark on the component.

The client device data storage 212 can also include conversion computer instructions 252. The conversion computer instruction 252 can be used for converting the graphic file into computer code for operating a high speed laser 216.

The high speed laser 216 can communicate with the client device processor 210 via a network 214.

A table 230 can be operatively aligned with the high speed laser 216. A component 232, depicted here as a window, can be placed on the table 230. The high speed laser 216 can provide a high speed laser beam 218. The high speed laser beam 218 can form a custom mark 240 into a portion of the component 232.

A water soluble spraying assembly 280 can be adjacent the high speed laser 216. The water soluble spraying assembly 280 can be used to provide one or more water based urethane glaze compounds, clear coats, or combinations thereof.

One or more infrared lamps 282 can be adjacent the water soluble spraying assembly 280 for drying the sprayed door or window.

Figure 3:
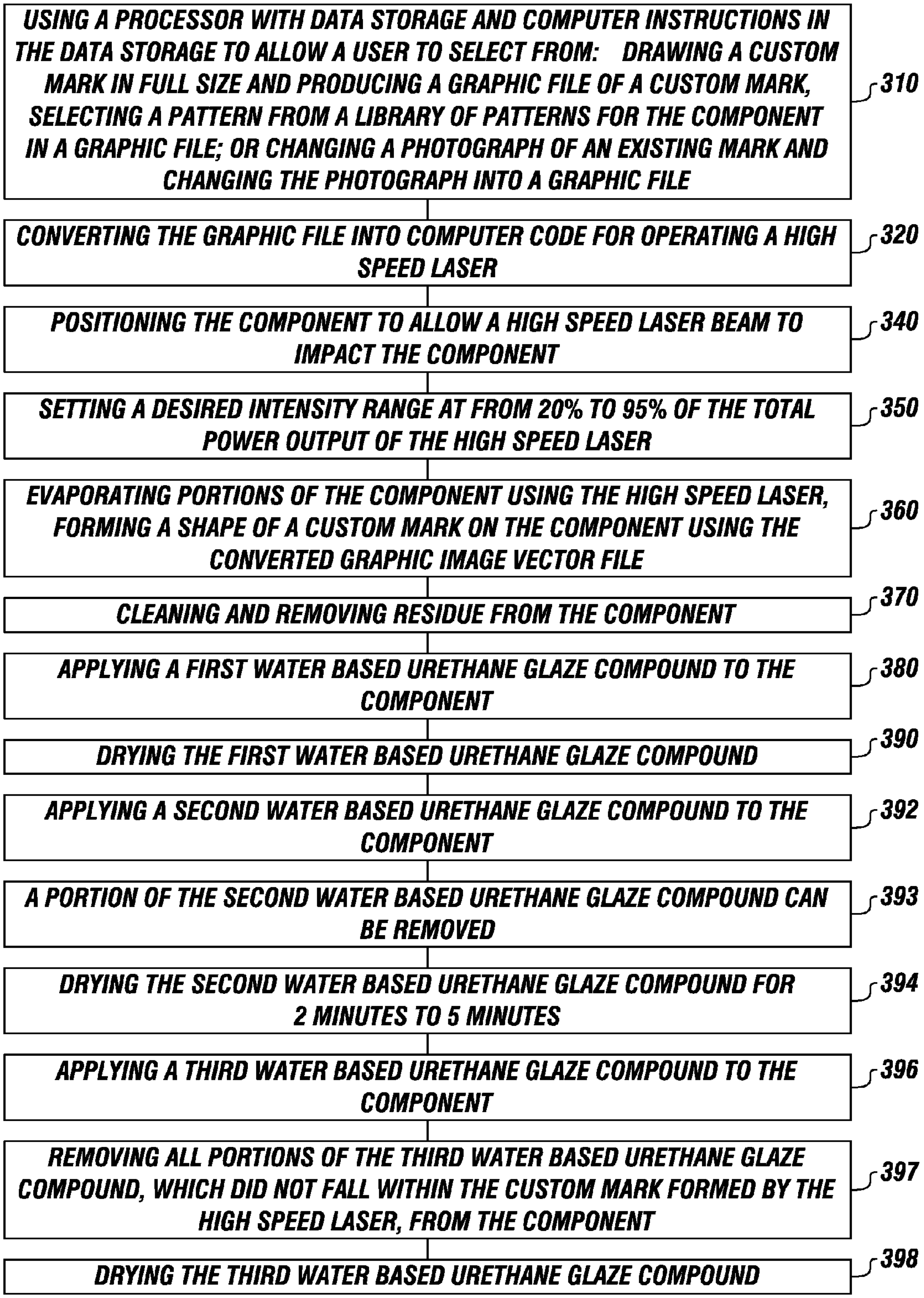
FIG. 3 is a flow diagram of an embodiment of the method.

FIG. 3 is a flow diagram of an embodiment of the method.

One or more embodiments can include using a processor with data storage and computer instructions in the data storage to allow a user to select from: drawing a custom mark in full size and producing a graphic file of a custom mark, selecting a pattern from a library of patterns for the component in a graphic file, or changing a photograph of an existing mark and changing the photograph into a graphic file, as shown at 310.

The method can also include converting the graphic file into computer code for operating a high speed laser, as depicted at step 320.

The method can also include positioning the component to allow a high speed laser beam to impact the component, as depicted at step 340.

The method can also include setting a desired intensity range at from 20 percent to 95 percent of the total power output of the high speed laser, as depicted at 350.

The method can also include evaporating portions of the component using the high speed laser, forming a shape of a custom mark on the component using the converted graphic image vector file, as depicted at 360.

As depicted at box 370, the method can include cleaning and removing residue from the component.

The method can also include applying a first water based urethane glaze compound to the component, as depicted at box 380. As depicted in box 390 the method can include drying the first water based urethane glaze compound.

The method can also include applying a second water based urethane glaze compound to the component, as depicted at 392. The second water based urethane glaze compound can be in a chromatically contrasting color to the first water based urethane glaze compound.

As depicted in box 393, a portion of the second water based urethane glaze compound can be removed.

The method can also include drying the second water based urethane glaze compound for 2 minutes to 5 minutes, as depicted at box 394.

The method can also include applying a third water based urethane glaze compound to the component, as depicted at box 396. The third water based urethane glaze compound can be in a chromatically contrasting color to the first water based urethane glaze compound and the second urethane glaze compound.

The method can also include removing all portions of the third water based urethane glaze compound, which did not fall within the custom mark formed by the high speed laser, from the component, as depicted at box 397.

Then, as depicted in box 398, the method can include drying the third water based urethane glaze compound.

While these embodiments have been described with emphasis on the embodiments, it should be understood that within the scope of the appended claims, the embodiments might be practiced other than as specifically described herein.

What is claimed is:

1. A method for forming marks in a component, wherein the method comprises:

a. using a processor with data storage and computer instructions in the data storage to allow a user to select from:
   (i) drawing a custom mark in full size and producing a graphic file of a custom mark;
   (ii) selecting a pattern from a library of patterns for the component in a graphic file; or
   (iii) changing a photograph of an existing mark and changing the photograph into a vector based graphic file;
b. converting the graphic file into computer code for operating a high speed laser;
c. positioning the component to allow the high speed laser beam to impact the component;
d. setting a desired intensity range for the high speed laser at from 20 percent to 95 percent of the total power output of the high speed laser, wherein the high speed laser is selected from the group: a carbon dioxide laser, a stroke Nd:YAG, (neodymium doped yttrium aluminum garnet) CW (continuous wave) diode-pumped laser, a Nd:YAG, CW lamp-pumped laser, a frequency-doubled ND:YAG laser, a helium-neon laser, a stroke CO.sub.2, sealed RF excited laser, a mask CO.sub.2, pulsed TEA laser and, a mask Excimer, pulsed laser;
e. evaporating portions of the component using the high speed laser, forming a shape of a custom mark on the component using the converted graphic image vector file;
f. cleaning and removing residue from the component;
g. applying by a water soluble spraying assembly adjacent the high speed laser a first water based urethane glaze compound to the component;
h. drying the first water based urethane glaze compound with an infrared lamp;
i. applying by the water soluble spraying assembly adjacent the high speed laser a second water based urethane glaze compound to the component, wherein the second water based urethane glaze compound is in a chromatically contrasting color to the first water based urethane glaze compound;
j. drying the second water based urethane glaze compound from 2 minutes to 5 minutes with an infrared lamp;
k. applying by the water soluble spraying assembly adjacent the high speed laser a third water based urethane glaze compound to the component, wherein the third water based urethane glaze compound is in a chromatically contrasting color to the first water based urethane glaze compound and the second urethane water based glaze compound;
l. removing at least a portion of the third water based urethane glaze compound, which did not fall within the custom mark formed by the high speed laser from the component; and
m. drying the third water based urethane glaze compound with an infrared lamp.

2. The method of claim 1, further comprising using a library of custom images that a user can select from to impart the custom mark on the component.

3. The method of claim 1, wherein the custom mark is similar to a plurality of distressed wood marks.

4. The method of claim 1, wherein the component is a door and the high speed laser evaporates a portion of the component to a depth of no more than 98 percent of the thickness of a front skin of the door forming the shape of the custom mark, wherein the component consists of: a fiber reinforced polymer substrate, fiberglass, a synthetic board, or wood.

5. The method of claim 4, wherein the high speed laser evaporates a portion of the component to a depth of from 1 micron to 2,000 microns.

6. The method of claim 4, further including moving the high speed laser beam at a speed of from 100 mm/sec to 20,000 mm/second.

7. The method of claim 4, including the step of etching a pattern across the component with a plurality of custom marks.

8. The method of claim 1, wherein the high speed laser has a power output of at least 200 watts of power.

9. The method of claim 1, wherein the component is a door, a window frame, a plank, a sidelight, a door frame, a window, a post, or combinations thereof.

10. The method of claim 1, wherein the component is made from fiberglass, polymers, wood, copolymers, composite material, or other synthetic or natural materials.

11. The method of claim 1, further comprising applying a clear coat to the entire surface that has been treated with the water based urethane glaze compounds.

12. The method of claim 11, further comprising allowing a thicker portion of the clear coat to collect in the custom mark.

13. The method of claim 1, wherein the water based urethane glaze compounds are antistatic.

14. A customized door created by:

a. using a processor with data storage and computer instructions in the data storage to allow a user to select from:
   (i) drawing a custom mark in full size and producing a graphic file of a custom mark;
   (ii) selecting a pattern from a library of patterns for the customized door in a graphic file; or
   (iii) changing a photograph of an existing mark and changing the photograph into a vector based graphic file;

b. converting the graphic file into computer code for operating a high speed laser;

c. positioning the customized door to allow a high speed laser beam to impact the customized door;

d. setting a desired intensity range for the high speed laser at from 20 percent to 95 percent of the total power output of the high speed laser wherein the high speed laser is selected from the group: (1) carbon dioxide laser, (2) stroke Nd: YAG, (neodymium doped yttrium aluminum garnet) CW (continuous wave) diode-pumped (3) Nd:YAG, CW lamp-pumped, (4) frequency-doubled ND:YAG, (5) helium-neon, (6) stroke CO.sub.2, sealed RF excited, (7) mask CO.sub.2, pulsed TEA and (8) mask excimer pulsed laser;

e. evaporating portions of a thin polymer layer on the surface of the customized door using the high speed laser, forming a shape of a custom mark on the customized door using the converted graphic image vector file;

f. cleaning and removing residue from the customized door;

g. applying by a water soluble spraying assembly adjacent the high speed laser a first water based urethane glaze compound to the customized door;

h. drying the first water based urethane glaze compound with an infrared lamp;

i. applying by the water soluble spraying assembly adjacent the high speed laser a second water based urethane glaze compound to the customized door, wherein the second water based urethane glaze compound is in a chromatically contrasting color to the first water based urethane glaze compound;

j. drying the second water based urethane glaze compound in 2 minutes to 5 minutes with an infrared lamp;

k. applying by the water soluble spraying assembly adjacent the high speed laser a third water based urethane glaze compound to the customized door, wherein the third water based urethane glaze compound in a chromatically contrasting color to the first water based urethane glaze compound and the second water based urethane glaze compound;

l. removing at least a portion of the third water based urethane glaze compound, which did not fall within the custom mark formed by the high speed laser, from the customized door; and m. drying by an infrared lamp the third water based urethane glaze compound; and wherein the customized door has: a first horizontal edge, a second horizontal edge a first vertical edge, and a second vertical edge with the horizontal edges connected to the vertical edge and a space formed between the connected edges, a closed cell foam located in the space providing thermal and sound insulation, a front skin disposed on a front side of the edges and the closed cell foam, and a back skin disposed on the edges and the closed cell foam Opposite the front skin.

15. A customized window created by:

a. using a processor with data storage and computer instructions in the data storage to allow a user to select from:
   (i) drawing a custom mark in full size and producing a graphic file of a custom mark;
   (ii) selecting a pattern from a library of patterns for the customized window in a graphic file; or
   (iii) changing a photograph of an existing mark and changing the photograph into a vector based graphic file;

b. converting the graphic file into computer code for operating a high speed laser;

c. positioning the customized window to allow a high speed laser beam to impact the customized window;

d. setting a desired intensity range for the high speed laser at from 20 percent to 95 percent of the total power output of the high speed laser wherein the high speed laser is selected from the group: (1) carbon dioxide laser, (2) stroke Nd: YAG, (neodymium doped yttrium aluminum garnet) CW (continuous wave) diode-pumped (3) Nd:YAG, CW lamp-pumped, (4) frequency-doubled ND:YAG, (5) helium-neon, (6) stroke CO.sub.2, sealed RF excited, (7) mask CO.sub.2, pulsed TEA and (8) mask excimer pulsed laser;

e. evaporating portions of a thin polymer layer on the surface of the customized window using the high speed laser, forming a shape of a custom mark on the customized window using the converted graphic image vector file;

f. cleaning and removing residue from the customized window;

g. applying by a water soluble spraying assembly adjacent the high speed laser a first water based urethane glaze compound to the customized window;

h. drying the first water based urethane glaze compound with an infrared lamp;

i. applying by the water soluble spraying assembly adjacent the high speed laser a second water based urethane glaze compound to the customized window, wherein the second water based urethane glaze compound is in a chromatically contrasting color to the first water based urethane glaze compound;

j. drying the second water based urethane glaze compound in 2 minutes to 5 minutes with an infrared lamp;

k. applying by the water soluble spraying assembly adjacent the high speed laser a third water based urethane glaze compound to the customized window, wherein the third water based urethane glaze compound in a chromatically contrasting color to the first water based urethane glaze compound and the second water based urethane glaze compound;

l. removing at least a portion of the third water based urethane glaze compound, which did not fall within the custom mark formed by the high speed laser, from the customized window; and m. drying the third water based urethane glaze compound with an infrared lamp.

* * * * *